United States Patent
Cullen

(10) Patent No.: US 7,654,253 B2
(45) Date of Patent: Feb. 2, 2010

(54) DETECTION OF A HUMIDITY SENSOR FAILURE IN AN INTERNAL COMBUSTION ENGINE

(75) Inventor: Michael J. Cullen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/169,959

(22) Filed: Jul. 9, 2008

(65) Prior Publication Data

US 2008/0270012 A1    Oct. 30, 2008

Related U.S. Application Data

(62) Division of application No. 11/689,422, filed on Mar. 21, 2007, now Pat. No. 7,398,775, which is a division of application No. 10/678,197, filed on Oct. 2, 2003, now Pat. No. 7,195,009.

(51) Int. Cl.
  *F02D 41/00* (2006.01)
  *F02D 1/00* (2006.01)

(52) U.S. Cl. .................. 123/690; 123/678; 73/118.1

(58) Field of Classification Search .......... 123/497, 123/677, 678, 690, 568.16; 73/116, 118.1, 73/118.2; 62/176.1
See application file for complete search history.

(56) References Cited

U.S. PATENT DOCUMENTS

| | | | |
|---|---|---|---|
| 5,609,126 A | 3/1997 | Cullen et al. | |
| 6,062,204 A | 5/2000 | Cullen | |
| 6,101,993 A | 8/2000 | Lewis et al. | |
| 6,575,148 B1 | 6/2003 | Bhargava et al. | |
| 6,581,447 B1 | 6/2003 | Strohrmann et al. | |
| 6,581,571 B2 | 6/2003 | Kubesh et al. | |
| 6,918,362 B2* | 7/2005 | Cullen | 123/90.15 |
| 7,104,228 B2* | 9/2006 | Cullen | 123/90.15 |
| 7,195,009 B2 | 3/2007 | Cullen | |
| 7,246,604 B2 | 7/2007 | Cullen | |
| 7,318,409 B2 | 1/2008 | Cullen | |
| 7,398,775 B2 | 7/2008 | Cullen | |
| 2002/0046741 A1 | 4/2002 | Kakuho et al. | |
| 2003/0046979 A1* | 3/2003 | Yamazaki et al. | 73/29.02 |
| 2003/0089165 A1* | 5/2003 | Yamazaki et al. | 73/118.1 |
| 2005/0072404 A1* | 4/2005 | Cullen | 123/399 |
| 2005/0072406 A1* | 4/2005 | Cullen | 123/494 |
| 2005/0072411 A1* | 4/2005 | Cullen | 123/690 |
| 2005/0211209 A1* | 9/2005 | Cullen | 123/90.17 |

\* cited by examiner

*Primary Examiner*—John T. Kwon
(74) *Attorney, Agent, or Firm*—Allan J. Lippa; Alleman Hall McCoy Russell & Tuttle LLP

(57) ABSTRACT

A method to determine degradation of a humidity sensor used for controlling an engine of a vehicle, the humidity sensor exterior to a passenger compartment of the vehicle, the method comprising determining whether to enable monitoring of the sensor based on a duration since vehicle operation; and in response to a determination to enable monitoring, comparing a signal from a second humidity sensor to a signal from the humidity sensor exterior to said passenger compartment of the vehicle to determine whether either of sensors has degraded.

5 Claims, 7 Drawing Sheets

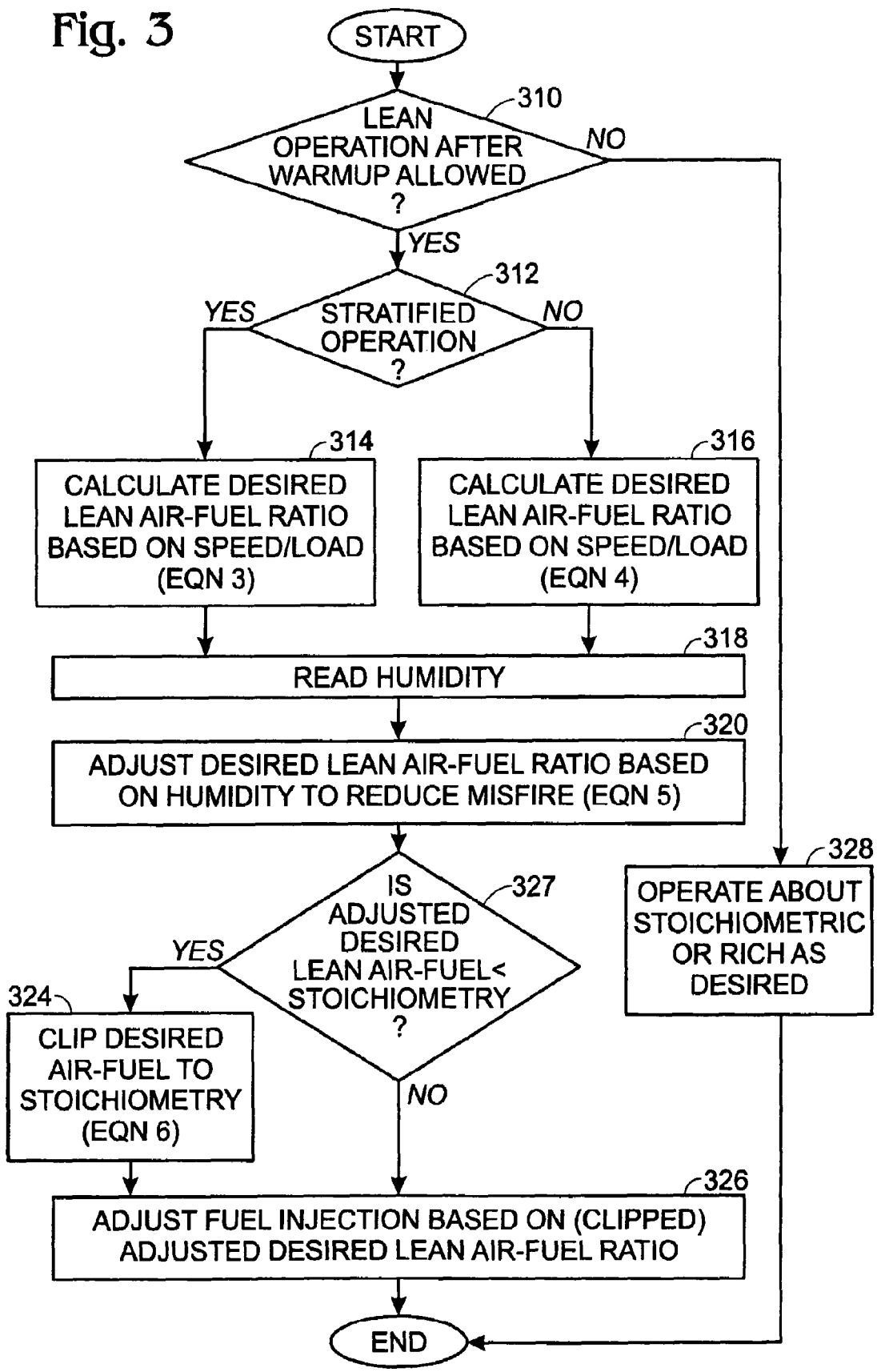

DETECTION OF A HUMIDITY SENSOR FAILURE IN AN INTERNAL COMBUSTION ENGINE

CROSS-REFERENCE TO PRIORITY APPLICATIONS

The present application is a divisional of U.S. patent application Ser. No. 11/689,422 filed Mar. 21, 2007 now U.S. Pat. No. 7,398,775, entitled "Detection of a Humidity Sensor Failure in an Internal Combustion Engine", which is a divisional of U.S. patent application Ser. No. 10/678,197 filed Oct. 2, 2003, now U.S. Pat. No. 7,195,009 issued Mar. 27, 2007, the entire contents of which are incorporated herein by reference.

FIELD OF THE INVENTION

The field of the present invention relates generally to the control of engine operation to reduce engine misfire conditions while maximizing engine fuel economy for passenger vehicles driven on the road.

BACKGROUND OF THE INVENTION

Engine control methods are known which utilize a humidity sensor, such as: U.S. Pat. No. 6,575,148.

The inventor herein has recognized a disadvantage with such approaches. Specifically, if the humidity sensor degrades, the engine can operate in regions that produce degraded performance, such as engine misfires, if the engine routines incorrectly presume the humidity is lower than the actual humidity of the ambient air.

Furthermore, the inventor of the subject application has recognized that the engine control sensors typically available fail to provide enough useful information to infer humidity.

SUMMARY OF THE INVENTION

The above disadvantages are overcome by a method to determine degradation of a humidity sensor used for controlling an engine of a vehicle, the humidity sensor exterior to a passenger compartment of the vehicle. The method comprises:

determining whether to enable monitoring of the sensor based on vehicle operating conditions;

in response to a determination to enable monitoring, comparing a signal from a humidity sensor interior to a passenger compartment of the vehicle to a signal from the humidity sensor exterior to said passenger compartment of the vehicle to determine whether either of said interior or exterior sensor has degraded.

By using the interior humidity sensor, which in some examples is already present for climate control systems, it is possible to accurately monitor the exterior humidity sensor with low overall vehicle cost. Further, by enabling the monitoring based on vehicle operating conditions, it is possible to perform the monitoring during conditions where the sensors are expected to provide relatively uniform information, thereby increasing degradation detection accuracy.

DESCRIPTION OF THE FIGURES

FIGS. 2-3, 5-7 and 8A-8B are high level flow charts illustrating operation according to an example embodiment of the invention.

DETAILED DESCRIPTION OF AN EMBODIMENT OF THE INVENTION

Figure 1A:
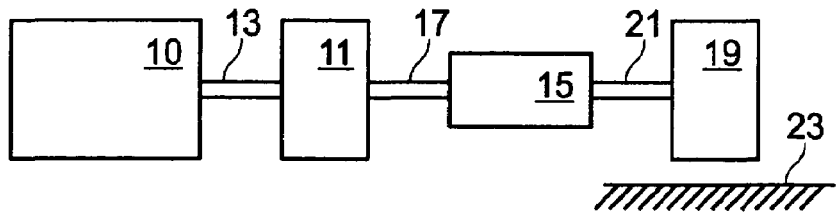
FIGS. 1A, 1B, and 4 are schematic diagrams of an engine wherein the invention is used to advantage.
Figure 2:
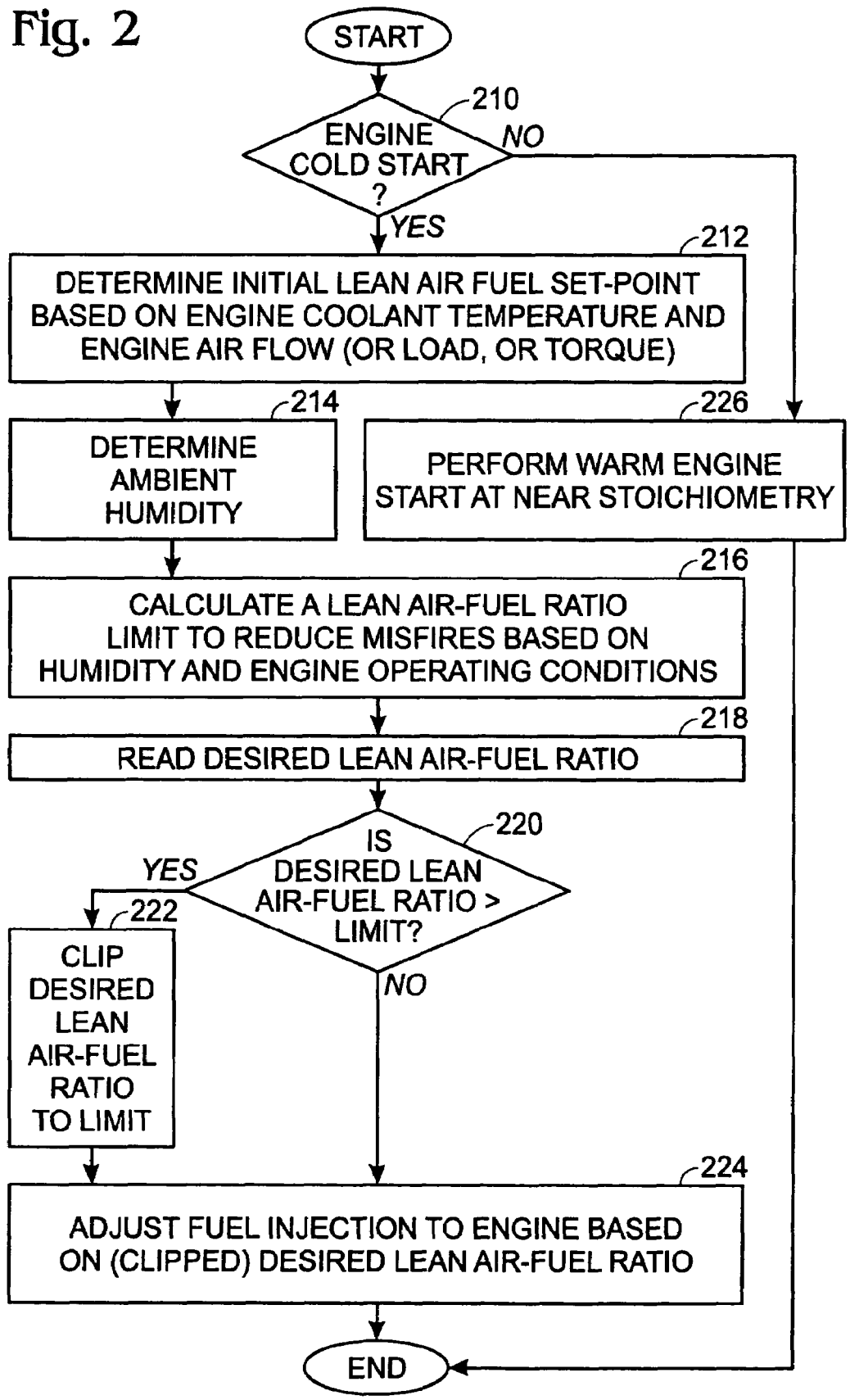

Referring to FIG. 1A, internal combustion engine 10, further described herein with particular reference to FIG. 2, is shown coupled to torque converter 11 via crankshaft 13. Torque converter 11 is also coupled to transmission 15 via turbine shaft 17. Torque converter 11 has a bypass clutch (not shown) which can be engaged, disengaged, or partially engaged. When the clutch is either disengaged or partially engaged, the torque converter is said to be in an unlocked state. Turbine shaft 17 is also known as transmission input shaft. Transmission 15 comprises an electronically controlled transmission with a plurality of selectable discrete gear ratios. Transmission 15 also comprise various other gears, such as, for example, a final drive ratio (not shown). Transmission 15 is also coupled to tire 19 via axle 21. Tire 19 interfaces the vehicle (not shown) to the road 23.

Figure 1B:
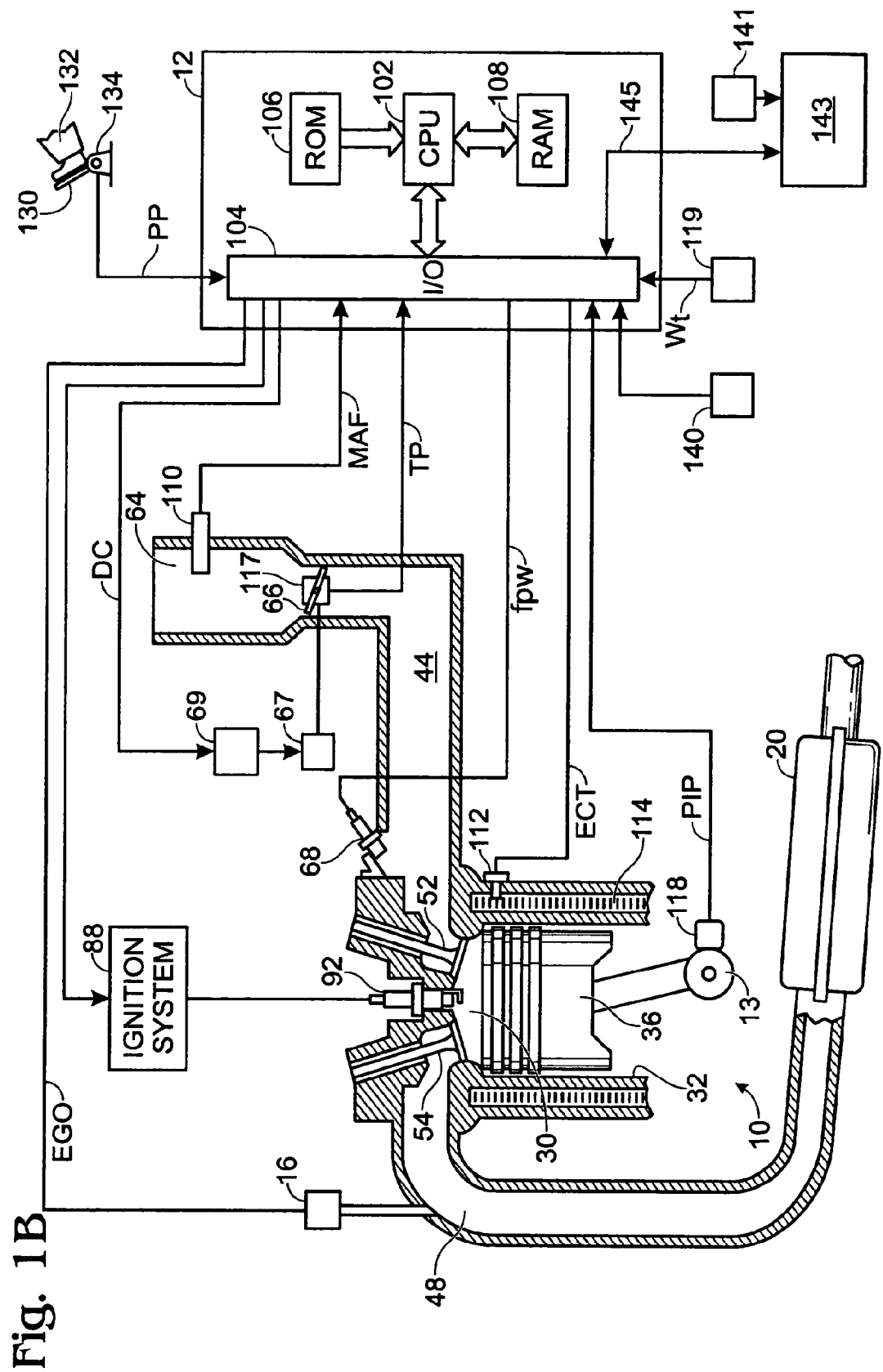

Internal combustion engine 10 comprising a plurality of cylinders, one cylinder of which is shown in FIG. 1B, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17, and a profile ignition pickup signal (PIP) from Hall effect sensor 118 coupled to crankshaft 13 indicating and engine speed (N).

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

In addition, an absolute, or relative, humidity sensor 140 is shown for measuring humidity of the ambient air. This sensor can be located either in the inlet air stream entering manifold 44, or measuring ambient air flowing through the engine compartment of the vehicle. Further, in an alternative embodiment, a second humidity sensor (141) is shown which is located in the interior of the vehicle and coupled to a second controller 143 that communicates with controller 12 via line 145. The diagnostic routines described below herein can be located in controller 12, or controller 143, or a combination thereof. Further note that the interior humidity sensor can be used in a climate control system that controls the climate in the passenger compartment of the vehicle. Specifically, it can be used to control the air-conditioning system, and more specifically, whether to enable or disable the air-conditioning compressor clutch which couples the compressor to the engine to operate the compressor.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Referring now to FIG. 2, an example routine is described for controlling engine fuel injection based on humidity. First, in step 210, the routine determines whether current conditions are for a cold engine start (versus a warm re-start). In other words, the routine determines based on various factors such as, for example: engine coolant temperature, time since engine start, engine speed, whether current conditions represent the starting of the engine during non warmed-up conditions or combinations thereof. When the answer to step 210 is yes, the routine continues to step 212. In step 212, the routine determines an initial lean air-fuel ratio set-point. This set-point, or desired lean air-fuel ratio, is used as described below herein to provide a balance between engine fuel economy and reduced emissions. In particular, this desired lean air-fuel ratio is determined based on various engine operating parameters, such as, for example: engine coolant temperature (ect), engine air flow (or engine load, or engine torque), measured vehicle emission such as NOx, time since engine start (atmr1) and various other parameters or combinations thereof. In one example, the desired air-fuel ratio (lean_AF_desired) is determined as described in the equation 1 below.

$$\text{Lean\_}AF\_\text{desired}=\text{table}A(ect,load)+\text{table}B(ect, atmr1) \quad \text{EQUATION 1}$$

Note that this desired air-fuel ratio is modified below depending on humidity, and in this particular example, ambient humidity. While the exact relationship between cam timing and the desired lean air-fuel ratio can vary from engine to engine, various testing can be performed to quantify this effect and also take into account the effect of variable cam timing, in combination with humidity, on the desired lean air-fuel ratio. In this alternate embodiment, equation 1 would be modified to include a desired lean air-fuel ratio based on variable cam timing position as well.

The present inventors herein have also recognized that the effect of humidity on the residual fraction is substantially linear with humidity in some cases. As such, as described below herein, a linear modifier to the desired lean air-fuel ratio can be utilized. Note however, that various other modifications can be used depending on the particular effect of humidity on the lean air-fuel ratio that can be achieved while reducing engine misfires.

Continuing with FIG. 2, in step 214 the routine determines an ambient humidity value. In one example, this is the ambient humidity measured from one or both of the humidity sensors. In another example, information from a humidity sensor, in combination with various other sensors, can be used to provide a modified, or estimated, humidity value. Then, in step 216, the routine calculates a lean air-fuel ratio limit that reduces engine misfires based on the humidity and engine operating conditions. Next, step 218, the desired lean air-fuel ratio, (determined in step 212) is read, taking into account any other modifications of the desired lean air-fuel ratio due to other engine systems (such as, for example: temperature modifications, engine speed modifications, or various others).

In step 220, the routine determines whether the lean air-fuel ratio is greater than the limit calculated in step 216. If so, the desired lean air-fuel ratio is clipped to the limit in step 222. In this way, it is possible to adjust the lean air-fuel ratio based on an engine misfire parameter taking into account humidity. The result is that improved engine fuel economy and reduced emissions can be achieved across a variety of ambient humidities, without sacrificing engine misfires.

In an alternate embodiment, the desired lean air-fuel ratio is adjusted to produce the desired lean air-fuel ratio taking into account potential engine misfires. In this case, the adjustment as described in equation 2 below.

$$\text{lean\_AF\_misfire} = \text{lean\_AF\_desired} - [FNAFHUM(N, load)*(\text{hum\_obs}-NOMHUM)] \quad \text{EQUATION 2}$$

where, hum_obs=ambient humidity,

NOMHUM=calibratable nominal humidity for which base schedule is optimized, usually 50 grams, FNAFHUM (N,load) is the change in A/F desired over the range of humidity, and N=RPM, or speed of the engine.

In this case, the measured humidity variation from a nominal humidity value (NOMHUM) is used as a linear adjustment to a humidity function (FNAFHUM) that is calculated as a function of current engine operating conditions of engine speed and engine load. This function represents, in one example, a change in the desired lean air-fuel ratio over the range of potential humidity experienced in an operating vehicle. Note also that this equation 2 can be modified to include an adjustment to the lean air-fuel ratio based on the deviation of the measured humidity from a nominal humidity value multiplied by a function dependent on variable cam timing position.

Continuing with FIG. 2, in step 224, the routine adjusts the fuel injection amount to the engine based on the clipped desired lean air-fuel ratio. Note that this adjustment can be in either an open loop or closed loop feedback control system. In particular, the fuel injection amount can be adjusted based on the desired lean air-fuel ratio as well as feedback from exhaust gas oxygen sensors located in the vehicle's exhaust.

Referring now to FIG. 3, an alternate embodiment of the present invention is described for adjusting a desired lean air-fuel ratio based on humidity outside of the vehicle. In this example, the engine is operated at a lean air-fuel ratio during various operating conditions in addition to engine warm-up conditions after a cold engine start. In particular, in step 310, the routine determines whether lean operation has been enabled after the engine warm up condition. If the answer to step 310 is YES, the routine continues to step 312. In step 312, the routine determines whether stratified operation is requested.

Note that stratified operation can be used in directly injected engines where the fuel injector is located to directly inject fuel into the engine cylinder. If the answer to step 312 is YES, the routine continues to step 314 to calculate a desired lean air-fuel ratio based on engine speed as described in equation 3.

$$lean\_AF\_desired = tableA(n, load) \qquad \text{EQUATION 3}$$

Alternatively, if homogenous lean operation is selected, then the desired lean air-fuel ratio is calculated based on equation 4 in step 316 using an alternate function of speed and load.

$$lean\_AF\_desired = tableB(n, load) \qquad \text{EQUATION 4}$$

Next, in step 318, the ambient humidity is read from the sensor, and optionally modified based on other sensor parameters and operating conditions. Then, in step 320, the routine adjusts the desired lean air-fuel ratio based on humidity to account for reduced engine misfire as indicated in equation 5.

$$lean\_AF\_misfire = lean\_AF\_desired - [FNAFHUM(n, load)*(hum\_obs - NOMHUM)] \qquad \text{EQUATION 5}$$

Next, in step 322, the routine determines whether the adjusted desired lean air-fuel ratio from step 320 has been adjusted past the stoichiometric point. In other words, the routine determines whether the adjustment based on the humidity (to the desired lean air-fuel ratio) has caused the desired lean air-fuel ratio to be adjusted to a rich value. If such conditions have been indicated, then in step 324 the desired air-fuel ratio is clipped to the stoichiometric value to reduce inadvertent rich operation. This is indicated as described in equation 6.

$$lean\_AF\_misfire = MAX(lean\_AF\_misfire, 1.0) \qquad \text{EQUATION 6}$$

Continuing with FIG. 3, in step 326 the routine adjusts the fuel injection into the engine based on the clipped adjustment of desired lean air-fuel ratio as described above. In this way, improved fuel economy, reduced engine misfires, and reduced emissions are achieved. Finally, if lean operation is not enabled and the answer to step 310 is no, the routine continues to step 328 to operate the engine to oscillate about the stoichiometric value, or to operate rich as desired by engine operating conditions.

Note that the adjustment of fuel injection based upon the desired air-fuel ratio can further take into account feedback from exhaust gas oxygen sensors. In other words, the desired air-fuel ratio, along with feedback from the oxygen sensor, are used in combination to maintain the actual air-fuel ratio at or near the desired value, and to track changes in the desired value due to, for example, changes in humidity.

Figure 4:
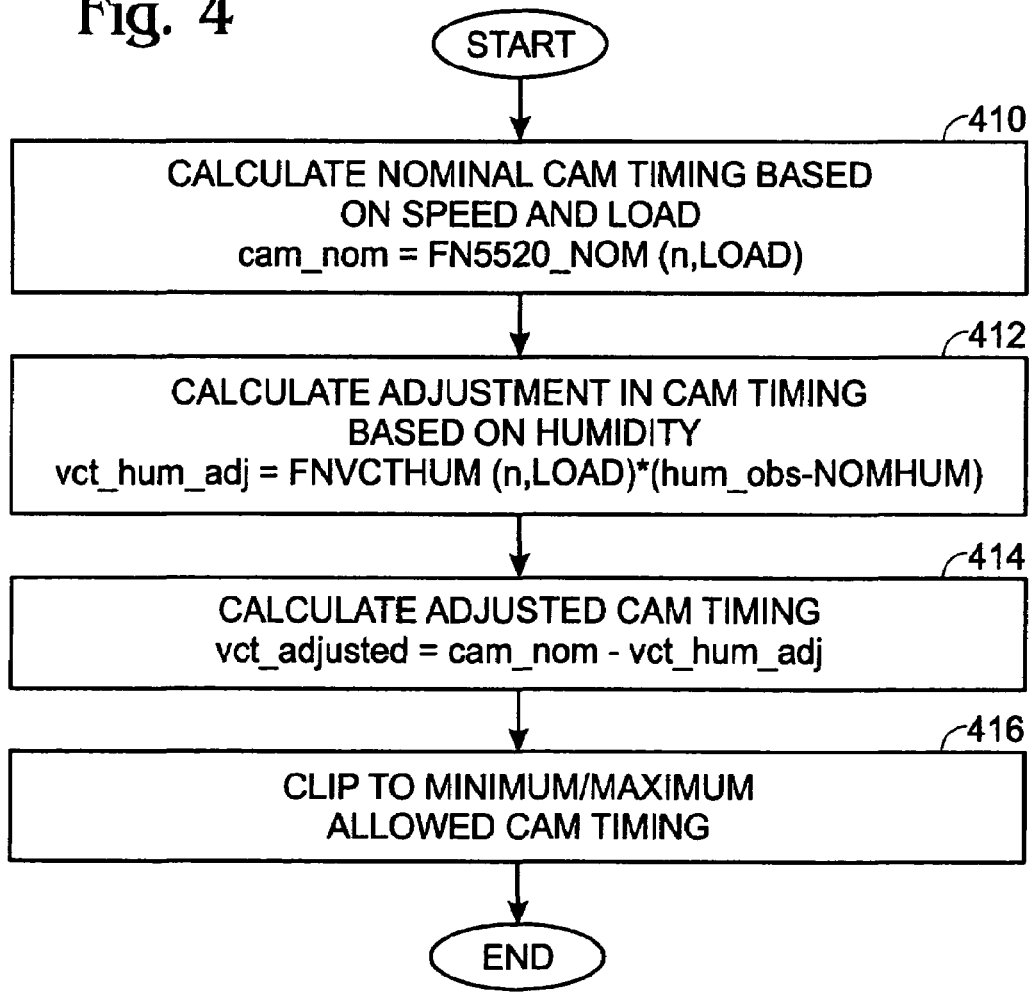

Referring now to FIG. 4, a routine is described for adjusting cam timing (and thus valve timing) based on humidity, specifically ambient humidity. Note that this embodiment is directed to changing valve timing by changing cam timing via a single overhead cam. However, various other valve timing mechanisms can be used. For example, the routine could also adjust intake or exhaust valve lift, intake or exhaust valve timing (e.g., via an electromechanical valve actuator), intake or exhaust valve cam timing, or adjust a dual equal cam timing which adjusts both intake and exhaust valve timing.

As described above, in internal combustion engines, it is desirable to schedule camshaft timing for best fuel economy and emissions. This typically occurs at a cam timing corresponding to high residual fraction (RF), sometimes termed internal EGR (Exhaust Gas Re-circulation). The extent of residual fraction is also referred to as the charge "dilution" level. Countering this use of high dilution is the tendency for misfire when the dilution interferes with spark ignition. As such, the optimal VCT for fuel economy and emissions is usually lies on one side of the misfire limit.

Ambient humidity also causes dilution of the engine cylinder charge mixture. Thus if the VCT timing was optimized for low humidity, resulting in being right on the edge of misfire, the addition of humidity would push the dilution over the edge into a potential misfire condition. To avoid this, engines are typically calibrated with the VCT timing schedule for a worst case high humidity day, avoiding misfires. This, of course, results in less than best fuel economy on lower humidity days.

Therefore a humidity sensor, such as an internal or ambient humidity sensor, can be used as described herein. Specifically, if the VCT timing schedule is adjusted for humidity, then the optimal timing for fuel economy can be delivered at a variety of humidity levels, while reducing misfire.

Figure 5:
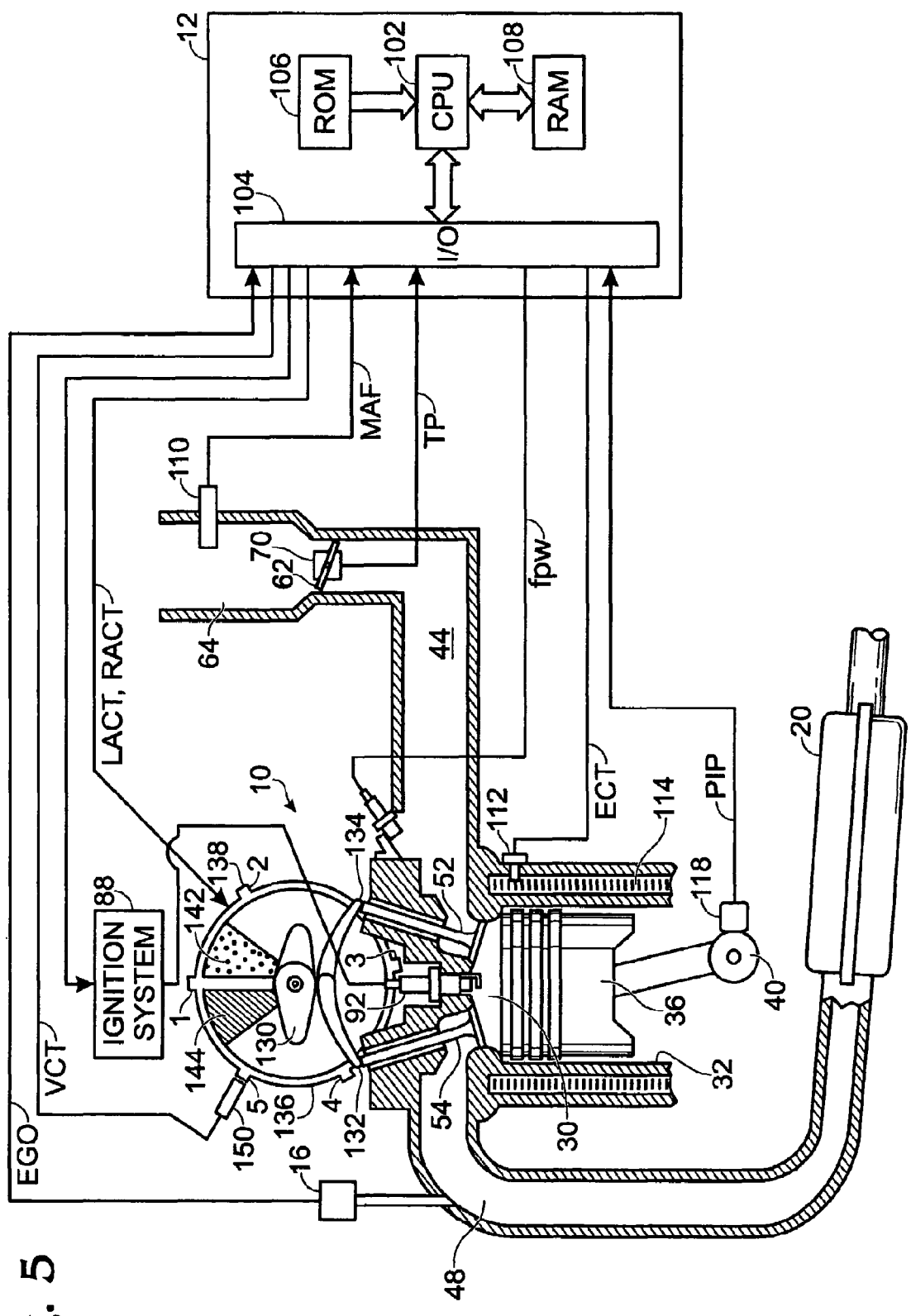

Note that cam timing can be controlled as described in U.S. Pat. No. 5,609,126, which is incorporated by reference in its entirety herein. However, it is adjusted as described with regard to FIG. 4. An engine with variable cam timing is shown in FIG. 5.

Referring now specifically to FIG. 4, the desired cam timing from step 225 of U.S. Pat. No. 5,609,126 is calculated as described below and adjusted based on humidity. First, in step 410, the routine calculates a nominal cam timing (cam_nom) based on speed (n) and load. Then, in step 412, the routine calculates an adjustment in cam timing (vct_hum_adj) based on the deviation of measured humidity (hum_obs) from a nominal value (NOMHUM). The adjustment is a function of engine parameters, such as engine speed and load as indicated in FIG. 4. Note that, as above, by using the deviation from a nominal value, it is potentially possible to reduce the calibration effort if a standardized function FNVCTHUM can be predetermined based on engine features. Note again that a linear adjustment is used, however various others can also be used based on experimental testing of the particular engine application.

Then, in step 414, the routine calculates the adjusted desired cam timing (vct_adjusted) based on nominal cam timing and cam timing adjustment as shown in FIG. 4. Then, in step 416, the routine clips the adjusted values to the maximum and/or minimum available cam timing at the present engine operating conditions.

In this way, it is possible to provide improved emissions and fuel economy that is not compromised due to variations in ambient humidity.

An alternative embodiment of internal combustion engine 10 is shown in FIG. 5. The engine is controlled by electronic engine controller 12. In this embodiment, engine 10 includes a variable valve adjustment mechanism, which in this example is a variable cam timing mechanism. As in FIG. 1, engine 10 includes combustion chamber 30 and cylinder walls 32 with piston 36 positioned therein and connected to crankshaft 40. Combustion chamber 30 is shown communicating with intake manifold 44 and exhaust manifold 48 via intake valve 52 and exhaust valve 54, respectively. Intake manifold 44 is shown communicating with throttle body 64 via throttle plate 62. Throttle position sensor 70 measures position of throttle plate 62. Exhaust manifold 48 is shown. Intake manifold 44 is also shown having fuel injector 80 coupled thereto for delivering liquid fuel in proportion to the pulse width of signal FPW from controller 12. Fuel is delivered to fuel injector 80 by a conventional fuel system (not shown) including a fuel tank, fuel pump, and fuel rail (not shown). Alternatively, the engine may be configured such that the fuel is injected directly into the cylinder of the engine, which is known to those skilled in the art as a direct injection engine. Also, as in FIG. 1, an electronically controlled throttle plate can be used.

Distributorless ignition system 88 provides ignition spark to combustion chamber 30 via spark plug 92 in response to controller 12. Two-state exhaust gas oxygen sensor 16 is shown coupled to exhaust manifold 48 upstream of catalytic converter 20. Sensor 16 provides signal EGO to controller 12 which converts signal EGO into two-state signal EGOS. A high voltage state of signal EGOS indicates exhaust gases are rich of a reference air/fuel ratio and a low voltage state of converted signal EGO indicates exhaust gases are lean of the reference air/fuel ratio.

Controller 12 is shown in FIG. 1 as a microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of mass air flow measurement (MAF) from mass flow sensor 116 coupled to intake manifold 44; and a profile ignition pickup signal (PIP) from Hall effect sensor 118 coupled to crankshaft 40. In one aspect of the present invention, engine speed sensor 119 produces a predetermined number of equally spaced pulses every revolution of the crankshaft.

Camshaft 130 of engine 10 is shown communicating with rocker arms 132 and 134 for actuating intake valve 52 and exhaust valve 54. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valve 52 and exhaust valve 54 open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valve 52 and exhaust valve 54 open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another), while tooth 5 is preferably used for cylinder identification, as described later herein. In addition, Controller 12 sends control signals (LACT,RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five toothed wheel, a measure of cam timing for a particular bank is received four times per revolution, with the extra signal used for cylinder identification.

Figure 6:
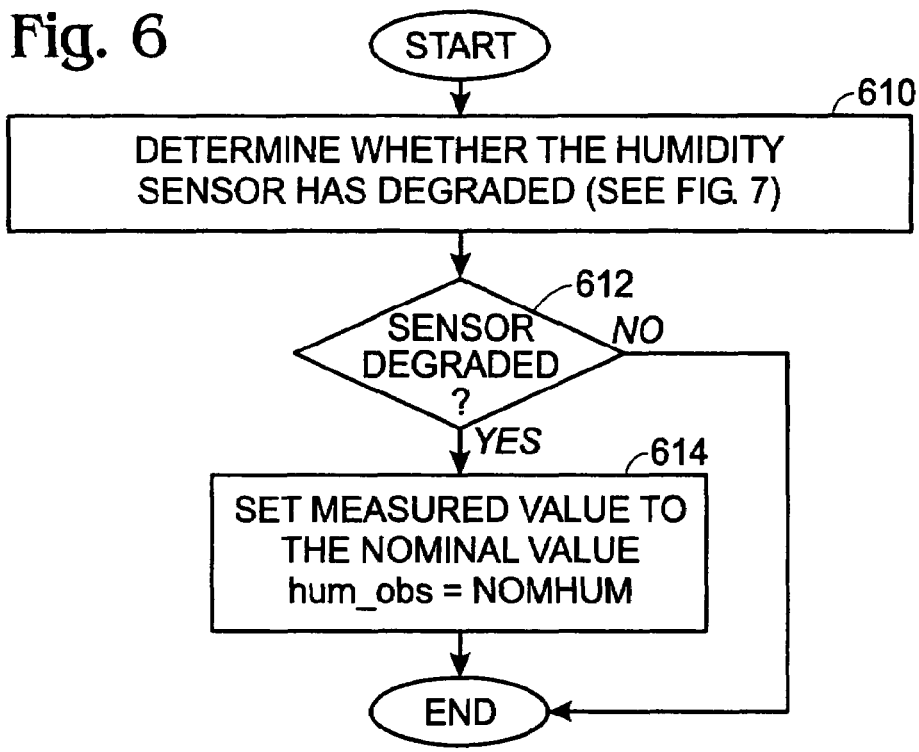

Referring now to FIG. 6, a routine is described for taking default action in response to degradation of the humidity sensor. First, in step 610, the routine determines whether the humidity sensor has degraded as described below herein with particular reference to FIG. 7.

Next, in step 612, the routine determines whether the sensor has degraded beyond a predetermined level. When the answer to step 612 is YES, the routine continues to step 614. In step 614, the routine sets the measured humidity sensor value in the control code (hum_obs) to the nominal humidity value (NOMHUM). In this way, default settings are used to control various engine operating conditions, such as, for example: engine air-fuel ratio, engine air-fuel ratio limit values, variable cam timing, exhaust gas recirculation, valve lift, and any combination or subcombination of these parameters. In particular, since the control routines are structured using the deviation of measured humidity from a nominal value, this allows for simplified routines in the case of default operation. In other words, as described above, the only action that need be taken in response to a degraded humidity sensor is to set the measured reading to the nominal value. In this way, the routines controlling the various engine operations simply operate as if there were no humidity sensor. In this way, smooth engine operation can be achieved even with humidity sensor degradation, thereby allowing continued engine operation.

Note that in one example, not only are default settings used to control the variable cam timing and air-fuel ratio limit value if the humidity sensor degrades, but other parameters as well, such as EGR. Specifically, as described in U.S. Pat. No. 6,062,204, (which is incorporated by references herein in its entirety), EGR is scheduled based on humidity. However, if sensor degradation has occurred, then the humidity value used for EGR can be set to a level that reduces engine misfires, such as, for example, 50. Alternatively the equation for EGR can be modified according to the following formula:

$$\text{Adjusted\_egr} = \text{base\_egr} + FN(\text{hum\_for\_egr}). \quad \text{EQUATION 7}$$

Figure 7:
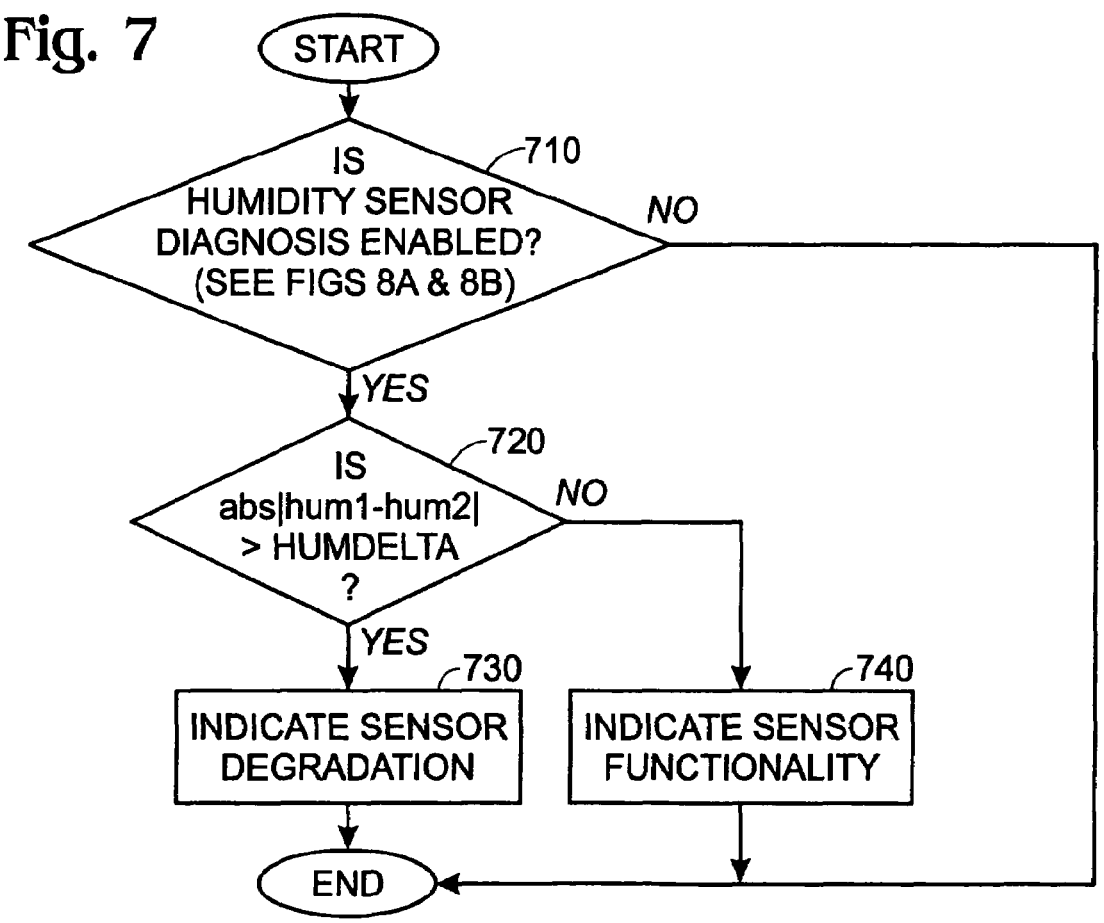
Figure 8A:
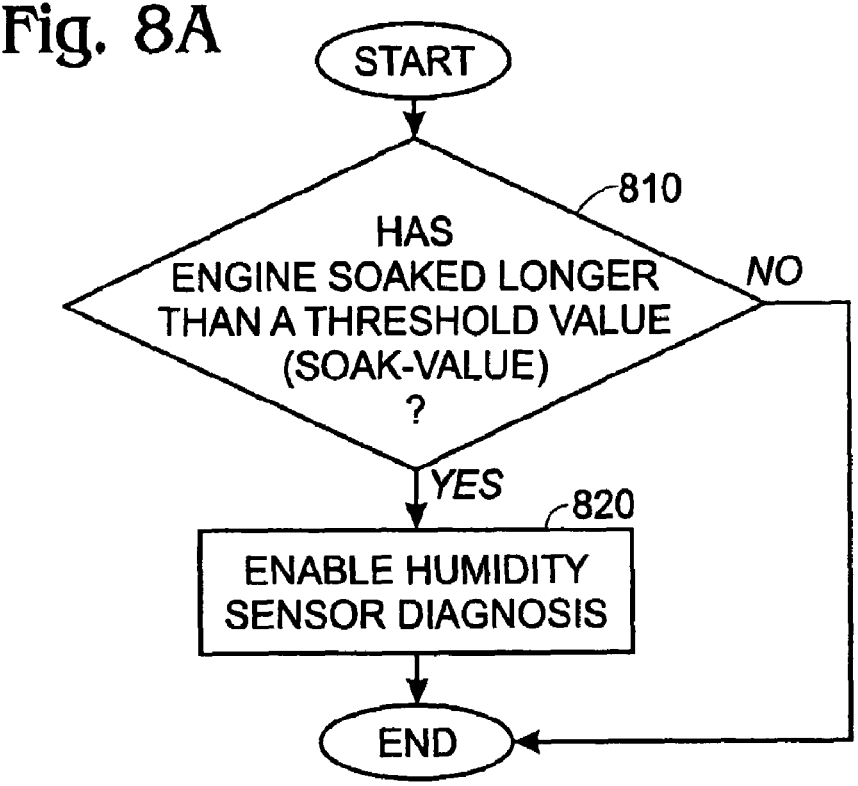
Figure 8B:
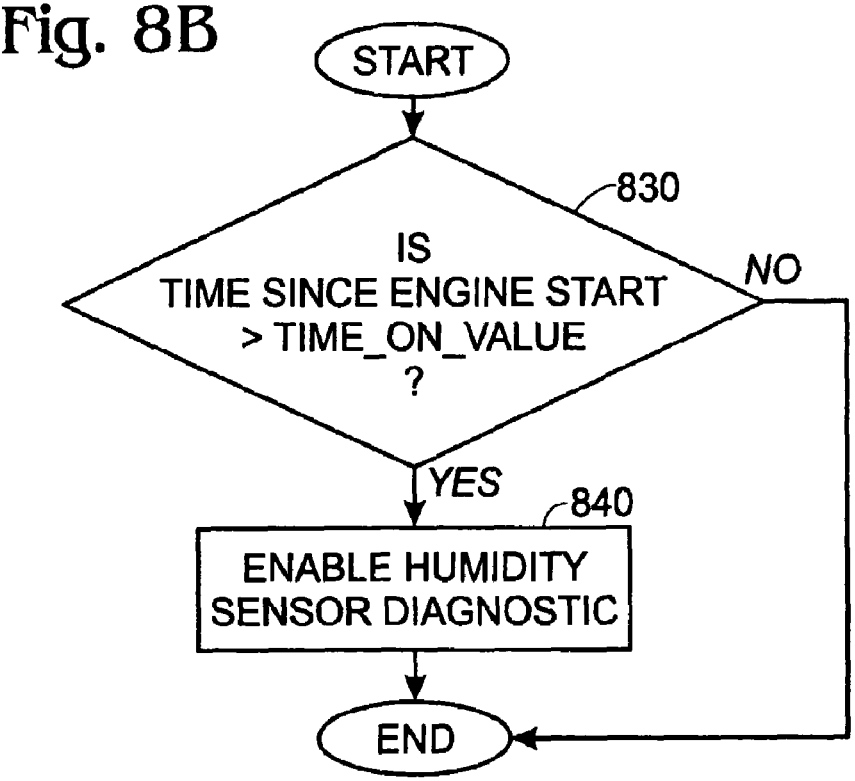

Referring now to FIGS. 7, 8A, and 8B, routines are described for determining degradation of the humidity sensor 140. One diagnostic approach described herein has two humidity sensors with sufficiently different wiring, location, and plant manufacturing batch number that they are very unlikely to degrade simultaneously. One diagnostic routine then consists of verifying that the sensors have the same reading, as described below. When the sensors are in separate locations in the vehicle, certain gates can be applied to narrow the diagnostic to certain operating regions where high correlation is expected, such as described in FIGS. 8A and 8B. Specifically, in this example, the two humidity sensors are labeled hum1 and hum2 herein for ease. I.e., sensor 140 provide hum 1 (or hum_obs) and sensor 141 provides hum2.

Referring now to FIG. 7, a routine is described for monitoring the sensors 140, and/or 141. Note that the term HUM_DELTA is the calibratable delta between the two sensors to indicate degradation has occurred. For example, it can be set to 10 grains.

First, in step 710, the routine determines whether monitoring of the humidity sensor(s) has been enabled as described below in two alternative embodiments (FIGS. 8A and 8B). If monitoring has been enabled, then in step 720 the routine determines whether the absolute value of (hum1−hum2) is greater than HUM_DELTA. If so, degradation is indicated in step 730. Otherwise, sensor operability is indicated in step 740.

A first embodiment to determine whether to enable humidity sensor monitoring is now described with regard to FIG. 8A. Here, the diagnostic is performed upon entering preselected engine operating conditions, such as: at key-on after a long soak (engine off) time. In this embodiment, the second sensor can be a vehicle interior humidity sensor as described in FIG. 1. Note that for a short soak, or for vehicle running operation, the interior sensor may read high due to a sweaty driver or other source of water vapor in the vehicle. Or, it may be low due to the action of an air conditioning system. As such, after a long soak, a more reliable comparison is possible. Even then, however, multiple vehicle trips can be used to increase the reliability of detection. In this way, the monitoring is enabled during selected conditions where both sensors should read similar values, and thus improved detection can be achieved. Note that in an alternative embodiment, one (or both) humidity signal(s) can be adjusted based on engine operating conditions to provide a more accurate comparison.

Referring now specifically to FIG. 8A, in step 810, the routine determines whether the engine soak time is longer than a threshold (SOAK_VALUE). If so, in step 820, diagnosis is enabled.

Note that the engine soak timer is a sensor that indicates the time since the car was last turned on. This could be based on a timer in controller 12, for example. The routine of FIG. 8A, in one embodiment, operates only on the first computer loop after a vehicle has the ignition key turned on.

A second embodiment performs the diagnostic on a continuous basis. This can be used when such continuous monitoring may be needed to determine degradation throughout vehicle operation. In this case the interior humidity sensor may not be used. Rather, the second humidity sensor is installed in the vehicle in a location where it would read close to the same air stream as the first sensor, whether it is in the engine inlet airflow stream or the ambient stream. Again, the electrical circuits can be designed to minimize the potential of common degradation of the sensors simultaneously. Also, the routine of FIG. 8B can perform the reading of the sensors for diagnosis when they have reached an equilibrium value by using filters, for example.

Referring now specifically to FIG. 8B, in step 830, the routine determines whether the time since vehicle key on is greater than a threshold values (TIME_ON_VALUE). If so, in step 840, diagnosis is enabled. Thus, by using the key on time it is possible to obtain an accurate reading from both sensors in order to perform the diagnosis.

Note that the routines can be used to monitor either sensor 141 or sensor 143, or both.

This concludes the description of the invention. The reading of it by those skilled in the art would bring to mind many alterations and modifications without departing from the spirit and the scope of the invention. Accordingly, it is intended that the scope of the invention be defined by the following claims:

The invention claimed is:

1. A method to determine degradation of a humidity sensor used for controlling an engine of a vehicle, the humidity sensor exterior to a passenger compartment of the vehicle, the method comprising:
    determining whether to enable monitoring of the sensor based on a duration since vehicle operation; and
    in response to a determination to enable monitoring, comparing a signal from a second humidity sensor to a signal from the humidity sensor exterior to said passenger compartment of the vehicle to determine whether either of sensors has degraded.

2. The method of claim 1 further comprising using default setting for engine actuators in response to a determination that said exterior sensor has degraded.

3. The method of claim 1 further comprising using default setting for an amount of exhaust gas recirculation in response to a determination that said exterior sensor has degraded.

4. The method of claim 1 wherein said duration since engine operating includes a time since a key-on engagement.

5. The method of claim 1 wherein said second sensor is located exterior to said passenger compartment of the vehicle.

* * * * *